July 28, 1931.  W. S. LEE  1,816,595
BRAKE EXPANDING MECHANISM
Filed Aug. 5, 1927

Inventor
William S. Lee
By Blackmore, Spencer & Hill
Attorneys

Patented July 28, 1931

1,816,595

UNITED STATES PATENT OFFICE

WILLIAM S. LEE, OF DETROIT, MICHIGAN, ASSIGNOR TO GENERAL MOTORS RESEARCH CORPORATION, OF DETROIT, MICHIGAN, A CORPORATION OF DELAWARE

BRAKE EXPANDING MECHANISM

Application filed August 5, 1927. Serial No. 210,889.

This invention relates to brakes and, particularly, to shoe expanding means for internal brakes, although the principles disclosed herein are applicable to other types of brakes and to clutches.

It is an object of this invention to provide a brake shoe expanding means, which is simple in construction, efficient in operation and which requires a minimum of manual effort to operate.

It is a further object to provide a brake actuating means in which full advantage of self actuation is taken.

Another object of this invention is to provide an improved toggle means for operating a brake.

In an ordinary toggle linkage operated brake, equal angular movements of the crank which operates the expanding means in the direction to apply the brake cause smaller and smaller movements of the shoes. This is, of course, due to the increasing mechanical advantage of the toggle linkage. It is desirable that equal angular movements of the crank shall cause equal displacements of the shoes, i. e., that the mechanical advantage of the expanding means shall be constant. It is an object of this invention to provide a brake expanding means which has a constant mechanical advantage and more specifically to provide a toggle linkage having a constant mechanical advantage for expanding the shoe or shoes of an internal brake.

Other objects of the invention will appear in the course of the following description of the embodiment of my invention shown in the accompanying drawings, in which.

Figure 1:
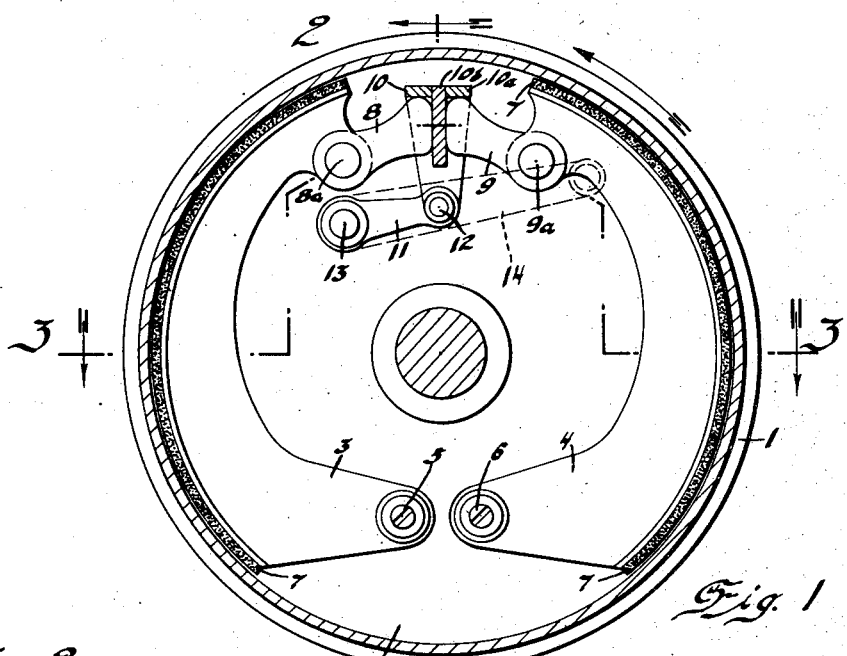
Figure 1 is a section through a brake drum taken on the line 1—1 of Figure 2 and showing the internal shoes and expanding mechanism therefor.
Figures 2, 3:
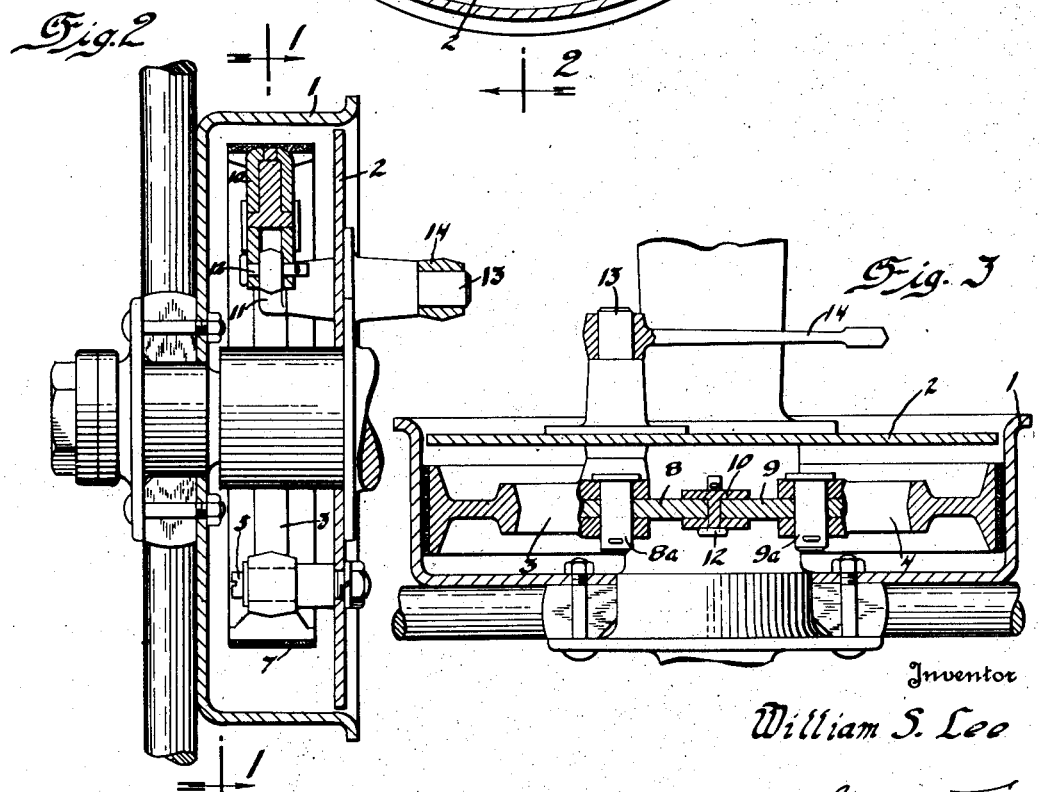
Figure 2 is a section taken on the line 2—2 of Figure 1.
Figure 3 is a section taken on the line 3—3 of Figure 1.

In the drawings, there is shown at 1 a brake drum which is shown carried by a vehicle wheel, but which may be positioned on a rotating transmission shaft or wherever a brake or clutch is used. The open side of the drum is closed by a backing plate 2. This plate, when the brake is used on a wheel, is carried by the axle, as shown in the drawings. To this plate are pivoted the brake shoes 3 and 4 by means such as the pins 5 and 6. The brake shoes are, as usual, provided with linings 7. To the free ends of the brake shoes 3 and 4 are pivoted toggle links 8 and 9, respectively, on centers $8a$ and $9a$, respectively.

The toggle-expanding member 10 consists of an inverted U-shaped part $10a$ and a part $10b$ bridging the side walls of the U-shaped part at a point substantially equidistant from each side thereof and extending from the base of the U-shaped part toward, but ending inward of, the open end thereof. The part $10b$ is secured to the base and side walls of the part $10a$ by lugs projecting from the former into openings in the latter. The construction of the member 10 has been described in detail but I do not intend limiting myself to this particular structure as it is obvious that it may be easily varied. The member 10 essentially T-shaped (as can be seen in Figure 1), the enclosing side walls being a refinement made desirable in order to prevent an undesirable mount of lateral movement of the free ends of the links 8 and 9.

The free ends of the toggle links 8 and 9 fit into the channel of the member 10 and have cam surfaces which bear against opposite sides of the part $10b$ and against the base of the U-shaped part. The side walls of the U-shaped part limit the lateral movement and the base prevents outward movement of the links beyond the confines of the T. The cam surfaces of the links are so shaped that, as the member 10 moves inwardly, the distance from the pivotal center of each link to the effective point of contact of each link with the part 10 increases, that is to say that as the part 10 moves inwardly the distance between the centers $8a$ and $9a$ increases which causes the shoes 3 and 4 to rock on their pivots and finally come into contact with the drum.

The mechanical advantage of the toggle linkage 8—10—9 is dependent on the ratio between the distance from the center 8a to the effective point of contact of the link 8 with the member 10 (or, since the links 8 and 9 are in this instance of the same length and similarly shaped, from the center 9a to the effective point of contact of the link 9 with the member 10) and the perpendicular distance to the effective point of contact of the link 8 (or 9) with the member 10 from the line drawn between the centers 8a and 9a. The term "effective point of contact" has been used because, as is clearly shown, the links 8 and 9 each contact with the toggle-expanding member 10 at two points. It is obvious that the point from which the distance to the point 8a (or 9a) is measured to determine the effective length of the link 8 (or 9) and from which the perpendicular distance to the line 8a—9a is measured is neither of these two points but lies somewhere between them. The cam surfaces of the links 8 and 9 which bear against the member 10 are so shaped that the mechanical advantage of the toggle linkage is kept constant throughout the range of movement of the linkage. It is apparent that the shape of the cam surface is dependent on many factors, so many in fact that the only practical way of designing the shape of the cam surface which has been found satisfactory is by experiment. It has been found desirable to have the cam operate so that it has sliding contact with the cross arm of the T-shaped member and rolling contact with the vertical leg.

Between the extremities of the legs of the part 10a there is pivoted, as indicated at 12, one end of one arm 11 of a crank. The other end of this arm is fixed to a shaft 13 which is journalled in a bearing in the backing plate 2. To the other end of the shaft 13 is fixed the other arm 14 of the crank which is adapted to be connected to a brake rod.

In considering the operation of the hereinbefore described brake shoe expanding means, it is to be borne in mind that self-actuation of a brake lessens the manual effort necessary to apply the brake. In an ordinary two shoe internal brake which is expanded by means of a cam mounted rigidly on a shaft, the effect of self-actuation of one shoe is lost due to the fact that the reverse effort of the other shoe on the cam is transmitted directly and entirely to the operator. My invention has overcome this defect and the full benefit of the self-actuation of one shoe is obtained and is not lost due to the action of the other shoe.

If the vehicle on which this brake is used is at rest and the clearance between the shoes 3 and 4 and the brake drum is substantially equal, manual application of the brake by means of the crank will pull the member 10 toward the center of the drum and thus force, through the toggle connection, the points 8a and 9a an equal distance from their original positions and apply equal forces to the two shoes.

If the vehicle is moving so that the drum turns in the direction indicated by the arrow (Figure 1) and the brake is applied manually, frictional engagement will tend to turn the shoe 3 in a counter clockwise direction about its pivot and relieve the pressure of the toggle link 8 on the T-shaped member. At the same time the rotation of the drum tends to rotate the shoe 4 about its pivot in a counter clockwise direction relieving the pressure of shoe 4 on the drum and increasing the pressure of the link 9 on the T-shaped member. The action of the shoe 3 in relieving pressure upon the T-shaped member aids the operator in applying the brake and is known as self-actuation. But this effect is lost if the reverse effort of the shoe 4 is communicated to the operator. My invention avoids this by the pivotal mounting of the member 10 on the arm 11, for when the pressure of the link 9 on the part 10 becomes greater than the pressure of the link 8 thereon, the member 10 swings on its pivot, bearing harder against the link 8 until the pressure of the two links on the member 10 is equalized. Thus the effort of shoe 4, which in an ordinary two-shoe, cam-operated brake resists the manual application of the brake, is here transmitted mainly to the shoe 3 and assists in the application of the brake rather than resists it. It is obvious that if the drum is turning in a direction opposite to that indicated by the arrow, 4 will be the self-actuated shoe. The operation of the brake will then be entirely analogous to that given above.

I have thus provided a toggle-linkage brake expanding means in which the mechanical advantage of the toggle linkage is constant and which takes advantage of self-actuation in a shoe brake. This expanding means is obviously also applicable to an internal band brake and the principles disclosed are applicable to many types of brakes and clutches.

Any preferred brake shoe releasing and centralizing mechanism may be used.

I claim:

1. In a brake, a drum, a backing plate, two shoes, each pivoted at one extremity to the backing plate and adapted to frictionally engage the drum on opposite sides thereof, a toggle link, having a cam surface on its free end, pivoted to the other extremity of each of the shoes, a member having a central leg and a cross arm against the opposite sides and ends of which, respectively, the cam surfaces of the two toggle links abut, an arm pivoted to the end of said member opposite the cross arm, a shaft having a bearing in the backing plate rigidly connected to the arm, and means for rocking the shaft and thus applying the brake.

2. In a brake, a rotatable member, means to frictionally engage the member, said means having adjacent but spaced ends, means to operate the brake including a toggle linkage comprising a link pivoted to each of the ends and a movable member having cam engagement with the links, the surfaces which are in cam engagement being so shaped as to cause the toggle linkage to have a substantially constant mechanical advantage throughout its range of movement.

3. In a brake, a drum, a member movable into engagement with the drum, a toggle linkage including a link and a second member, said link having cam engagement with one of the members and being pivoted to the other of the members, the surfaces which are in cam engagement being so shaped as to cause the toggle linkage to have a substantially constant mechanical advantage throughout its range of movement, and means to move the second member to operate the brake.

4. In a brake, a rotatable member, means to frictionally engage the member, said means having adjacent but spaced ends, means to operate the brake including a toggle linkage comprising a link pivoted to each of the ends and a movable member having cam engagement with the links, the surfaces which are in came engagement being so shaped as to cause the toggle linkage to have a substantially constant mechanical advantage throughout its range of movement.

5. In a brake, two relatively movable members adapted to frictionally engage each other, a toggle linkage including a link pivoted to one of the members and having a cam surface and a movable member engaged with the cam surface, the cam surface being so shaped as to cause the toggle linkage to have a substantially constant mechanical advantage throughout its range of movement, and means to move the member to apply the brake.

6. In a brake, a drum, a pivoted shoe, a toggle linkage including a link pivoted to the shoe and having a cam surface, and a movable member engaged with the cam surface, the cam surface being so shaped as to cause the toggle linkage to have a substantially constant mechanical advantage throughout the range of its movement, and means to move the member to apply the brake.

7. In a brake, a drum, two pivoted shoes, a toggle linkage including a link pivoted to each shoe and having a cam surface, a movable member engaged with the cam surface, the cam surface being so shaped as to cause the toggle linkage to have a substantially constant mechanical advantage throughout its range of movement, and means to move the member to apply the brake.

8. In a brake, two relatively movable members adapted to frictionally engage each other, means to cause frictional engagement of the members, including a link pivoted to one of the members and having a cam surface, a bodily movable element engaging the cam surface and means to operate the element to apply the brake.

9. In a brake, a rotatable member, means adapted to frictionally engage said member, said means having adjacent but spaced ends, means to cause frictional engagement of said first-mentioned means and the member, including a link having a cam surface and pivoted to each of the adjacent ends of said first-mentioned means, a floating element engaging the cam surfaces of the links, and means to operate the element to apply the brake.

10. In a brake, a rotatable member, means adapted to frictionally engage the member, said means having adjacent but spaced ends, a floating element, a pair of links, each of which extends between one of the spaced ends of said means and the element and is pivoted to the one and has cam engagement with the other, and means to operate the element to apply the brake.

11. In a brake, a rotatable member, means adapted to frictionally engage the member, said means having adjacent but spaced ends, means to cause frictional engagement of the first-mentioned means and the member, including a link pivoted to each of the adjacent ends of the first-mentioned means, an element located between and having cam engagement with the ends of the links, and means to operate the element to apply the brake.

12. In a brake, two relatively movable members adapted to frictionally engage each other, means to cause frictional engagement of the members, including a link pivoted to one of the members, an element having cam engagement with the link, an arm pivoted to the element, and means to rock the arm to apply the brake.

13. In a brake, two relatively movable members adapted to frictionally engage each other, means to cause frictional engagement of the members including a bodily movable member and an element carried by one of said first mentioned relatively movable members, said bodily movable member and said element having camming contacting surfaces, and means to operate said bodily movable member and element to apply the brake, the engaging cam surfaces being so shaped as to cause the operating mechanism to have a substantially constant mechanical advantage throughout its range of movement.

14. In a brake, a rotatable member, means adapted to frictionally engage the member, said means having adjacent but spaced ends, a floating element, a pair of links, each of which extends between one of the spaced ends of said means and the element, and is pivoted to the one and has cam engagement with the other, and means to operate the element to apply the brake, the surfaces which are in cam engagement being so shaped as to cause the operating mechanism to have a substantially constant mechanical advantage throughout its range of movement.

In testimony whereof I affix my signature.
WILLIAM S. LEE.